United States Patent [19]

Kawashima et al.

[11] Patent Number: 5,377,791
[45] Date of Patent: Jan. 3, 1995

[54] REGENERATIVE BRAKE DEVICE AND A POWER TRANSMISSION DEVICE FOR ELECTRIC MOTOR VEHICLES

[75] Inventors: Yoshinori Kawashima; Kenji Tamaki; Shoji Motodate; Yoshihiro Nakazawa; Masayuki Toriyama; Noriyuki Maeda; Yoshimi Osanai, all of Saitama, Japan

[73] Assignee: Honda Giken Kogyo Kabushiki Kaisha, Tokyo, Japan

[21] Appl. No.: 35,528

[22] Filed: Mar. 16, 1993

Related U.S. Application Data

[63] Continuation of Ser. No. 700,520, May 15, 1991, abandoned.

[30] Foreign Application Priority Data

May 16, 1990 [JP] Japan .................. 2-51139
Mar. 18, 1991 [JP] Japan .................. 3-078551

[51] Int. Cl.6 ............................. B60L 7/10
[52] U.S. Cl. ..................... 188/159; 290/44; 303/20; 318/139; 318/254; 192/4 R
[58] Field of Search .......... 318/139, 138, 376, 254, 318/439, 511; 188/156-164; 303/20; 290/44.45; 180/65.1, 907, 65; 192/4 A, 4 R

[56] References Cited

U.S. PATENT DOCUMENTS

| | | | |
|---|---|---|---|
| 3,878,913 | 4/1975 | Lionts et al. | 290/44 |
| 4,181,366 | 1/1980 | Dobner | 303/3 |
| 4,246,988 | 1/1981 | Hoppie | 192/4 A X |
| 4,544,868 | 10/1985 | Murty | 318/254 |
| 4,547,678 | 10/1985 | Metzner et al. | 290/45 |
| 4,659,149 | 4/1987 | Rumsey et al. | 303/3 |
| 4,671,577 | 6/1987 | Woods | 188/159 |
| 4,908,553 | 3/1990 | Hoppie et al. | 318/376 X |
| 4,962,969 | 10/1990 | Davis | 188/156 X |

FOREIGN PATENT DOCUMENTS

| | | |
|---|---|---|
| 0280478 | 8/1988 | European Pat. Off. . |
| 54-38043 | 3/1979 | Japan . |
| 236701 | 2/1990 | Japan . |
| 2159011 | 11/1985 | United Kingdom . |

OTHER PUBLICATIONS

Patent Abstracts of Japan, vol. 010, No. 367, Dec. 1986.

Primary Examiner—Matthew C. Graham

[57] ABSTRACT

A regenerative brake device increases its regenerative brake power during high-speed driving, without impairing driveability. A regenerative brake device includes a driving wheel linked with a rotary shaft of an electric motor through a power transmission system and a battery charging circuit provided between the electric motor and a set of batteries. The battery charging circuit is switched OFF and ON to execute the regenerative braking in response to the duty factor of control pulse signals inputted to the battery charging circuit. The duty factor of control pulse signals inputted to the battery charging circuit decreases as the rotational speed of the rotary shaft of the electric motor increases, thereby increasing the braking power within a range that does not exceed a predetermined braking power.

19 Claims, 14 Drawing Sheets

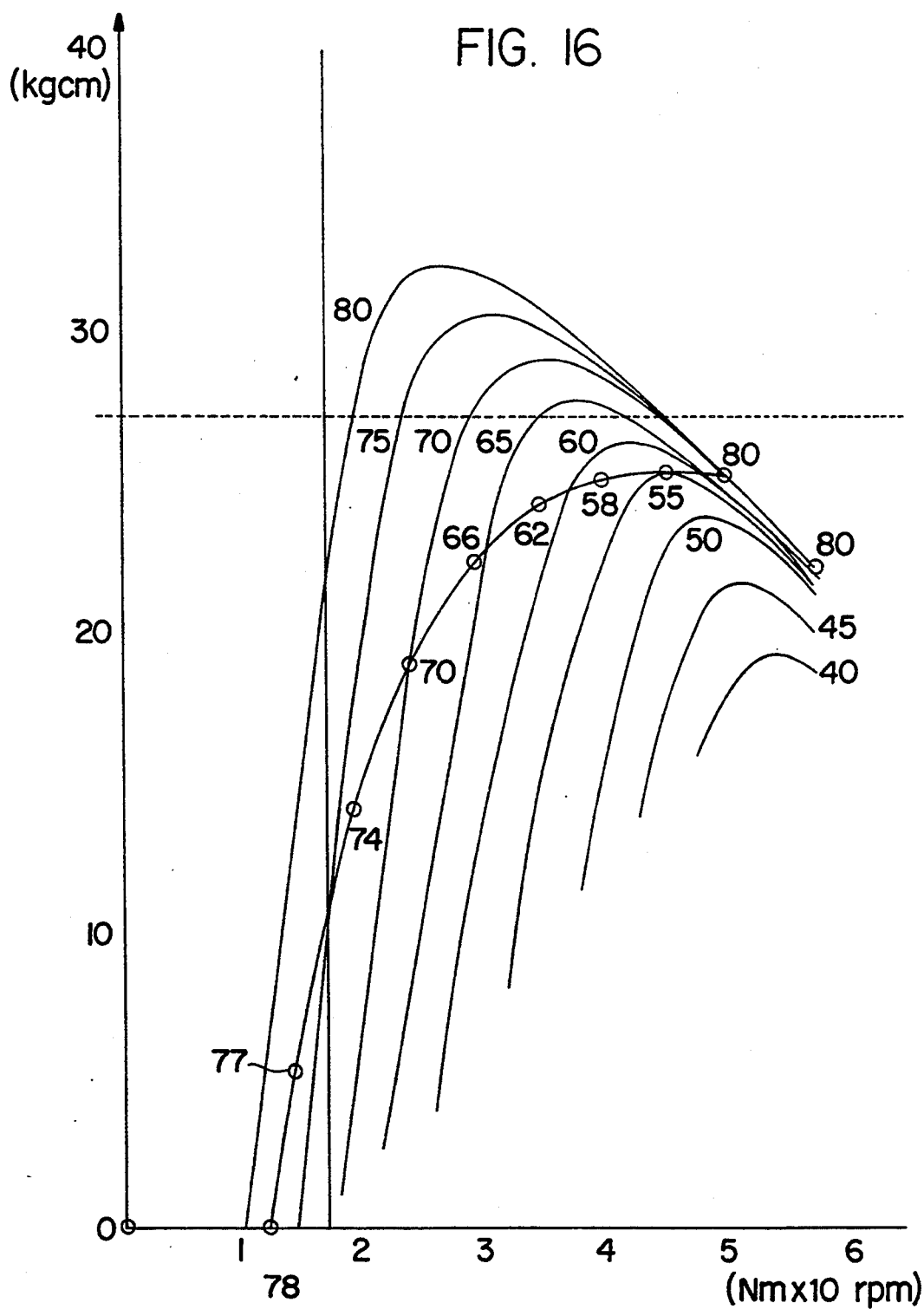

REGENERATIVE BRAKE DEVICE AND A POWER TRANSMISSION DEVICE FOR ELECTRIC MOTOR VEHICLES

This application is a continuation of application Ser. No. 07/700,520 filed on May 15, 1991, now abandoned.

BACKGROUND OF THE PRESENT INVENTION

1. Field of the Present Invention

The present invention relates to a power transmission for electric motor vehicles such as motorcycles and auto-tricycles having an electric motor as the source of power, and more particularly, to a power transmission device which employs a belt-driven non-shift transmission.

The present invention is also related to a regenerative braking device for electric motor vehicles, and more particularly, to a regenerative braking device which controls a duty factor of control signals which actuate a charging circuit to effectuate braking power without becoming excessive or losing driveability of the vehicle.

2. Conventional Art

Conventional electric motor vehicles are exemplarily described in the Japanese Patent Application Laid-Open No. 54-38043 which discloses an electric motor vehicle having a direct-current motor as a source of power and a clutch to engage with the motor when the motor is rotating to drive the vehicle.

Also, as described in the Japanese Patent Application Laid-Open No. 2-36701, a regenerative brake device employed for electric motor vehicles has an electric motor, a battery and a battery charging device with switch elements bridge-wired thereto. When braking is applied, the regenerative brake device outputs control pulse signals to the battery charging circuit to cause the battery charging circuit to switch OFF and ON, thereby charging the battery with power generated by the electric motor.

Since the characteristic structure of the electric motor vehicle causes the engagement and disengagement of the clutch device to be controlled simply by the rotational speed of the electric motors, the conventional electric motor vehicles, as discussed above, pose a problem such that the driveability of the vehicle is inevitably impaired when the motor, at the time when power transferred from the driving wheel to the electric motor is damped or decelerated, slows down and is disengaged from the driving wheel.

As is also conventionally known, an electric motor vehicle has mounted thereon an electric motor powered by a battery to drive and run the vehicle. It is common to employ electric braking by utilizing kinetic energy of the vehicle to charge the battery.

The electric braking is carried out by charging the battery through the electric motor. The charging of the battery is controlled by control signals having a certain duty factor. When the duty factor of the control pulse signals inputted to the battery charging circuit is constant, as described above, the braking power relative to the rotation of a motor inevitably demonstrates upwardly-projected parabolic characteristics as illustrated in FIG. 16. When these characteristics reach their maximum peak, braking power becomes excessive and causes impairment to the driveability of the vehicle during braking.

It may be recognized to solve the above-described problem by selecting a duty factor for the control pulse signals in a range to prevent the braking power from becoming excessive at the maximum. However, such an attempt may lead to yet another problem as it causes the braking power demonstrating upwardly-projected parabolic characteristics to become lower in the range of high-speed and low-speed rotation such that not enough braking power is available at the high-speed range.

OBJECTS AND SUMMARY OF THE PRESENT INVENTION

It is an object of the present invention to provide a regenerative braking device which maintains driveability during braking at high speeds.

It is another object of the present invention to provide a regenerative braking device which provides adequate braking power by lowering a duty factor as the speed of an electric motor increases.

It is still another object of the present invention to provide parallel clutch mechanisms to efficiently convert the kinetic energy of the vehicle to electric energy.

These and other objects, as well as, the various advantages of the present invention will be more readily realized from the detailed description of the present invention given below.

In view of one of the problems inherent to the conventional electric motor vehicles, the present invention provides a power transmission device for electric motor vehicles with a motor and a driving wheel linked to each other to transmit power therebetween. The power transmission device is provided with a primary clutch to engage the electric motor with the driving wheel when the rotational speed of the electric motor exceeds a predetermined primary rotational speed so that a driving torque is transmitted from the motor to the driving wheel. The power transmission device is also provided with a secondary clutch, in parallel with the primary clutch, to engage the motor with the driving wheel when the rotational speed of the electric motor exceeds a predetermined secondary rotational speed which is slower than the predetermined primary rotational speed.

A power transmission device for electric motor vehicles according to the present invention has provided, between a driving wheel and a motor, a primary clutch which allows the motor to transmit therethrough driving power to the driving wheel when normally running and when driving power is generated by the rear wheel when damping or deceleration. The driving wheel and the motor are kept in engagement by a secondary clutch until a slow speed range is reached. With this structure, the motor serves as a resistor to decelerate vehicle, thereby maintaining driveability and realizing excellent performance in damping and deceleration.

Also, in view of the above problems, the present invention has provided a regenerative brake device for electric motor vehicles which can achieve increasing braking power as the rotation of an electric motor gains in speed and realizes better driveability and braking performance when the electric motor is at a high-speed rotation.

To solve the above-described problem with respect to braking, the present invention provides a regenerative brake device for electric motor vehicles having a driving wheel and an electric motor linked with each other through a power transmission system. The present invention includes a battery charging circuit provided between the electric motor and a battery to switch OFF and ON to effectuate regenerative braking in correspondence to a duty factor of control pulse signals inputted thereto. The duty factor of the control pulse signals inputted to the battery charging circuit is set to be small in a high-speed range relative to the rotation of the shaft of the electric motor and increases within a range to cause the braking power not to exceed a predetermined level as the rotation of the shaft decrease.

According to the present invention, a regenerative brake device for electric motor vehicles can be structured with a primary clutch provided in the power transmission system which responds to the rotation of the shaft of the electric motor such that the primary clutch disengages the power transmission system when the rotation of the shaft slows below a predetermined speed.

A regenerative brake device for electric motor vehicles, as described above, can be further structured with a secondary clutch provided in the power transmission system and in parallel to the primary clutch which responds to the rotation of the driving shaft such that the secondary clutch engages the power transmission system in a range of rotational speeds not exceeding the rotation speed which causes the primary clutch to disengage.

Further yet, a regenerative brake device for electric motor vehicles, according to the present invention, can be equipped with a non-shift power transmission provided in the power transmission system to effectuate regenerative braking through the battery charging circuit while shifting to a high deceleration ratio.

Furthermore, given that a conventional regenerative brake device for electric motor vehicles has braking power characteristics relative to the rotation of an electric motor which demonstrate upwardly-projected parabolic characteristics such that the duty factor of control pulse signals serve as a parameter, i.e., decreasing braking power as a duty factor decreases, a regenerative brake device for electric motor, according to the present invention, is structured to generate control pulse signals having a duty factor which decreases as the rotation of an electric motor increases in speed, thereby increasing braking power in a range not exceeding a predetermined level as the rotational speed of the electric motor increases.

Moreover, a regenerative brake device for electric motor vehicles, according to the present invention, provided with a primary clutch in the power transmission system which effects its engagement in response to the rotation of an electric motor exceedings a predetermined speed can regenerate braking without failure in a range with the electric motor in high-speed rotation and realize efficient recovery of energy.

The secondary clutch, provided in parallel to the primary clutch, can be structured to effect its engagement at a rotational speed slower than the rotational speed allowing the primary clutch to effect its engagement. Thus structured, a regenerative brake device for electric motor vehicles, according to the present invention, realizes efficiency recovery of energy.

Another characteristic aspect of a regenerative brake device for electric motor vehicles, according to the present invention, is the provision of a non-shift power transmission to effect regenerative braking while shifting to a high-speed ratio, thereby allowing the electric motor to accelerate even when the driving wheel slows down in speed, and accordingly, raising the efficiency of energy recovery.

BRIEF DESCRIPTION OF THE DRAWINGS

The present invention will become more fully understood from the detailed description given below and the accompanying drawings which are given by way of illustration only, and thus are not limitative of the present invention, and wherein:

FIG. 16 illustrates the deceleration characteristics of deceleration torque relative to rotational speed of the electric motor and the duty factor of the control signals.

DETAILED DESCRIPTION OF THE PREFERRED EMBODIMENTS

The present invention is described below with reference to the accompanied drawings which illustrate the preferred embodiments of the present invention.

Figure 1:
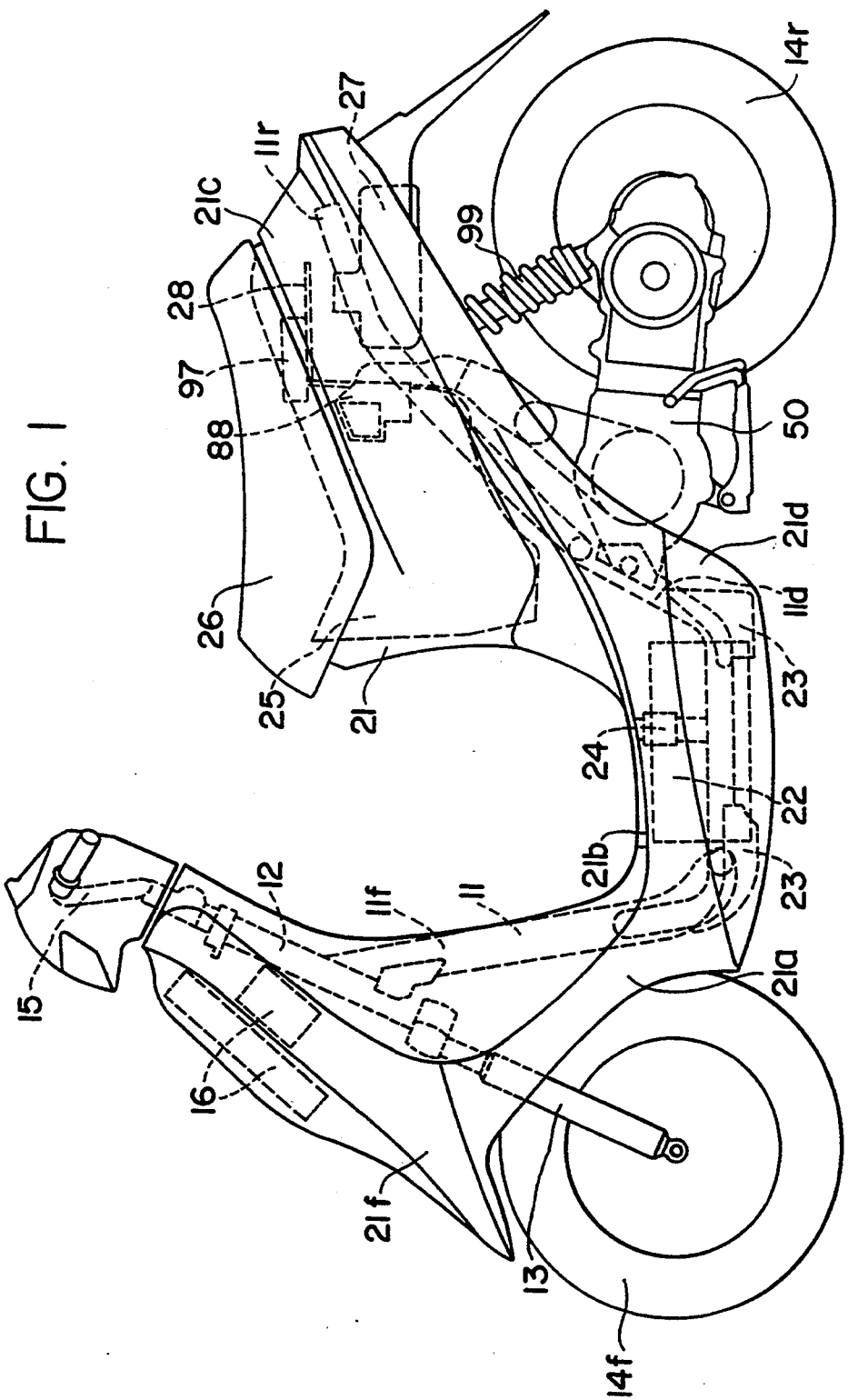
FIG. 1 is a sideview of an electric motor vehicle employing the regenerative braking system of the present invention.

With respect to FIG. 1, a vehicle frame 11 is formed in a substantially U shape as seen from the sides and is provided with a front frame 11f, a center frame 11d and a rear frame 11r. The vehicle frame 11 is covered with a resin-made body having a front cover 21f, a leg shield 21a, a step floor 21b, a rear cover 21c and an under cover 21d.

The vehicle frame 11 of FIG. 1 has fixed to the front section of the front frame 11f a head pipe 12 to which a front wheel is supported through a front fork 13 to be manipulated with a handlebar 15. Though not shown in FIG. 1, the handlebar 15 is equipped with an acceleration sensor 437 of FIG. 10 composed of a potentiometer to detect the angle of the acceleration grip.

The head pipe 12 has provided at its front section a control box 16 having its front section covered with the front cover 21f. Inside the control box 16, there are housed a controller 49 composed of such elements as an ECU to be described below.

The vehicle frame 11 has a battery box 22 provided in the center frame 11d which has a power swing unit 50 supported thereto with a pivot shaft to allow its swing movement. As described below, the power swing unit 50 is structured to have such elements as an electric motor 52 housed in a casing 51 which rotatably supports a rear wheel (driving wheel). Designated with numeral 99 is a cushion unit provided between the rear section of the power swing unit 50 and the vehicle frame 11.

The battery box 22 is mounted on a battery holder secured to the center frame 11d with a belt 24. The battery box accommodates therein a plurality of batteries 436 of FIG. 10 which, wired either in parallel or serially, are connected to a driving circuit described below. Though not shown in the drawings, the battery holder 23 is composed of a plate element suspended in the width direction of the vehicle under the center frame 11d. The battery box 22 mounted on this battery holder 23 has provided thereon a step floor 21b fitted with the belt 24.

The vehicle frame 11 has also provided on the rear frame 11r the rear cover 21c which is formed with a hollow cylindrical element opening at its upper section covered with the sheet 26 to close the opening. The seat 26 is fitted to the upper section of the rear cover 21c with a hinge to close the opening and allow seating thereon and to leave the opening uncovered when it is pulled down toward its front end.

Positioned above the rear wheel, the rear cover 21c accommodates therein a trunk box 25 and a charging box 27 set in the front and rear thereof. The trunk box 25 opens at an upper section covered with the above-described sheet 26 and is large enough to store a crash helmet.

The charging box 27 has a front section upwardly projecting to present a substantially L shape in a side-view angle and has a front section opening. The charging box 27 accommodates therein a charger to charge with the commercial power supply source and a front opening covered with a lid 28. The lid 28 has provided thereto the charging circuit 92 which, with the charger and other elements, are connected to the batteries 436.

In FIG. 1, an air intake duct 88 is provided inside the rear cover 21c. This air intake duct 88 has one of its end linked to a cooling air inlet of the power swing unit 50 and the other opening inside the rear cover 21c.

Figure 6:
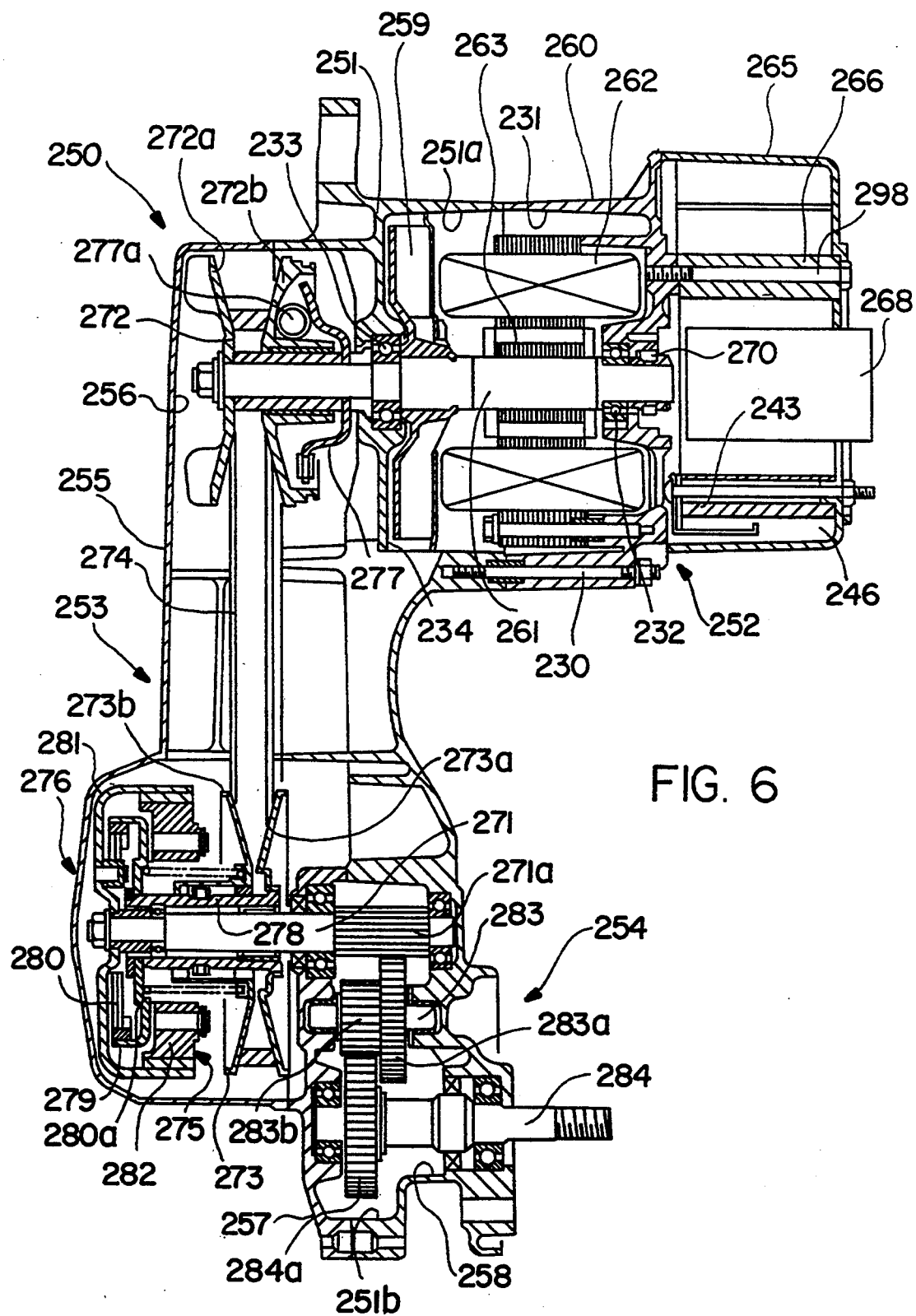
FIG. 6 is a third embodiment of the transmission of system of the present invention.

As shown in FIG. 6, the power swing unit 250 has integrally assembled thereinto a casing 251 supported by the vehicle frame 211 at its front end to allow its swinging movement and the electric motor 252, the non-shift transmission 253 and a terminal velocity deceleration mechanism 254. The casing is cast of aluminum to have a recess 251a on the right side of the front and a recess 251b on the left side of the rear section.

The casing 251 has formed in the front right side recess 251a a motor box 231 to accommodate the electric motor 252 with its motor casing fixed thereto, and in the rear left side recess 251b a gear box 258 to accommodate the terminal velocity deceleration mechanism 254 with its bearing element 257 fixed thereto. On the left side section, a power transmission box 256 accommodates the non-shift power transmission 253 with a side cover 255 fixed thereto. The motor box 231 and the power transmission box 256 are linked through a ventilation hole 234 formed in the casing 251 near the bottom of the recess 251a to allow air ventilation therethrough. The power transmission box 256 opens to the air through a ventilation hole (not shown).

The motor casing 260 presents the shape of a bottom cylinder opening secured to the casing 251 with a bolt 230 to match the opening of the recess 251a in their position. At the bottom of the motor casing 260, there is provided a bearing 232 which, together with a bearing 233 provided at the bottom of the recess 251a of the casing 251, rotatably supports a rotary shaft 261 inside the motor box 231.

The rotary shaft 261 has one of its ends passing through the bottom of the recess 251a to be linked with the non-shift transmission 253 and the other passing through the bottom of the motor casing 260. The rotary shaft 261 has a cooling fan provided at the section facing with the ventilation hole 234 in the vicinity of the bottom of the recess 251a inside the motor box 231. Secured at the center of the motor box 231, a rotor composed of magnets is mounted with a rotation sensor 270 secured to the end passing through the motor casing 260. As conventionally known, the rotor 263 is structured with magnets and positioned inside a stator.

Rotating integrally with the rotary shaft 261, the cooling fan conducts cooling air into the motor box 231 through the air intake duct 288 and expels this cooling air to the power transmission box 256 through the ventilation hole 234. The rotation sensor 270 comprises magnets secured to the rotary shaft 261 and magnetic sensitive elements, such as MR, fitted to the right surface of the motor casing 260 at the bottom and connected to the controller 449 of FIG. 10. The rotation sensor detects the position and rotation speed of the rotary shaft 261 and outputs detected signals to the controller 449 of FIG. 10.

Figure 10:
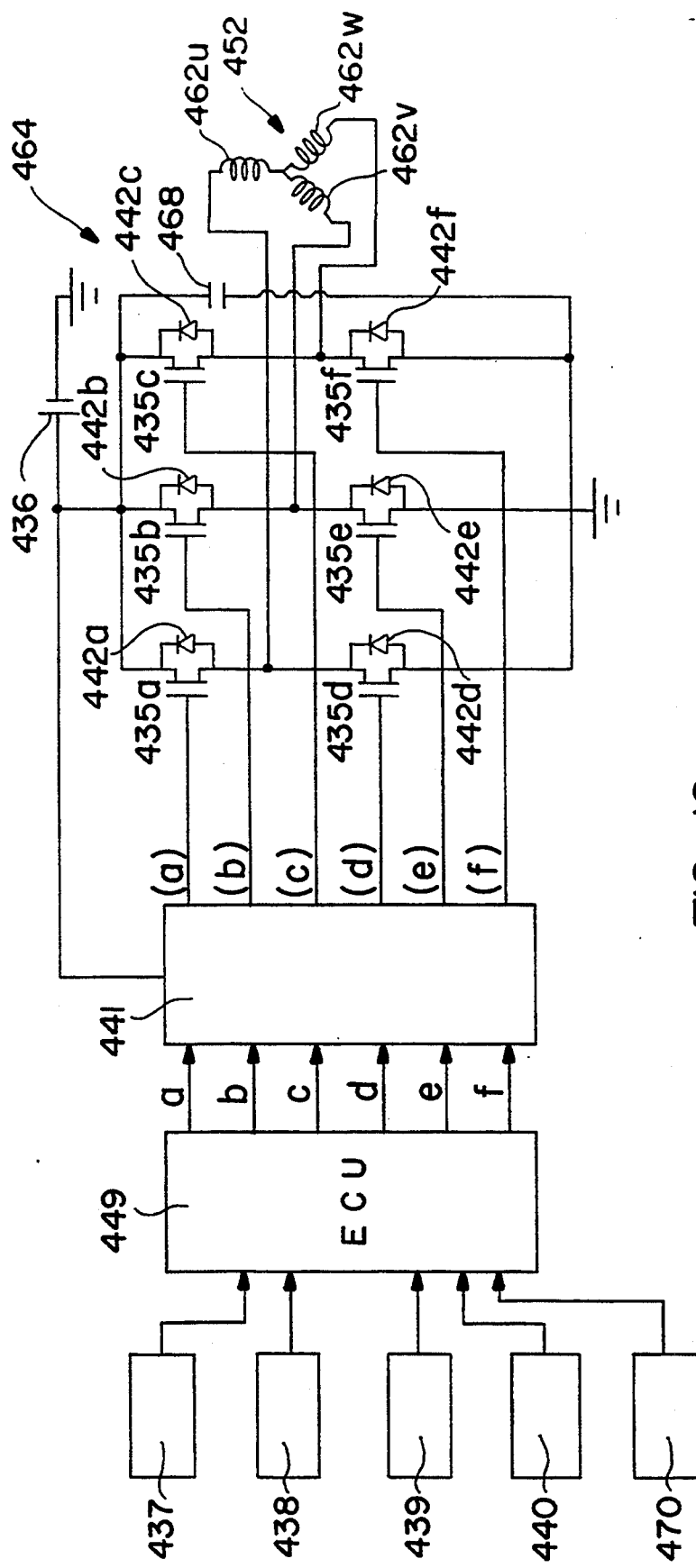
FIG. 10 illustrates the circuit diagram for the regenerative braking system of the present invention.

The motor casing 260 has secured to the left surface on the side of the motor box three stator coils 462u, 462v and 462w of FIG. 10 but designated as numeral 262 in FIG. 6 which constitute the stator and secured to the right surface a heat sink 266. The three stator coils are Y-connected as illustrated in FIG. 10 and connected to the driving circuit described below.

The heat sink 266 is formed in the shape of a hexagonal cylinder made of projection-molded aluminum alloy presenting a substantially hexagonal cross section formed on the inner circumference cooling fins (not shown). This heat sink 266 is secured to the motor casing 267 with a bolt passing therethrough in its axial direction and screwed to the motor casing 260 and covered over the outside with a cover 265 made of plastic. This cover 265 is fitted to the heat sink 266 with plastic, such as epoxy resins, to fill in a gap with the outer surface of the heat sink 266.

The heat sink 266 has six surface sections provided with as many field effect transistors (FET) 435a, 435b, 435c, 435d, 435e and 435f as illustrated in FIG. 10 to constitute the driving circuit (battery charging circuit) 464 as illustrated in FIG. 10. The heat sink 266 has also provided on the inner circumference a capacitor 468 as shown in FIG. 10 to stabilize a power supply. Though not shown in the drawings, there is provided between this capacitor and the inner circumference of the heat sink 266 a cooling air passage linked with the air intake duct 288 and having the cooling fins projecting therein.

The non-shift power transmission 253 is structured with a belt 274 suspended between a driving pulley 272 and a driven pulley 273. The driving pulley 272 is provided to the rotary shaft 261 of the electric motor 252 and the driven pulley 273 is secured to a sleeve 278 rotatably mounted on an input shaft 271 of the terminal velocity deceleration mechanism 254. This driven pulley 273 passes through a primary centrifugal clutch 275 and a secondary centrifugal clutch 276, provided in parallel, to be linked with the input shaft 271.

The driving pulley 272 is structured with a fixed face gear 272a secured to the rotary shaft 261 and a movable face gear 272b mounted on the rotary shaft 261 slidably in its axial direction. This driving wheel 272 shifts in its axial direction with its movable face gear driven by a pressure regulator mechanism 277 provided with a weight 277a to change the diametrical size of the belt 274 in correspondence to the rotation of the rotary shaft 261.

Similarly, the driven pulley 273 is structured with the fixed face gear 273a secured to the sleeve 278 and the movable face gear 273b mounted on the sleeve slidably in its axial direction. This driven pulley 273 is energized toward the fixed face gear 273a under the influence of a spring 280a pressed in a gap with an outer clutch 279 of the secondary centrifugal clutch 276 to have its movable face gear 273b shifting and changing the diametrical size of the belt in correspondence to a change in the diametrical size of the belt around the driving pulley 272.

The secondary centrifugal clutch 278 is structured with an outer clutch 279 fixed to the sleeve 278 and an inner clutch 280 fixed to the outer clutch 281 of the primary clutch 275. This secondary clutch 276 effects its engagement and disengagement in correspondence or response to the rotational speed of the outer clutch 281, and accordingly, the rotational speed of the rear wheel 14r. With the outer clutch 281 fixed to the input shaft 271 and the inner clutch 282 provided to the outer clutch 279 of the secondary centrifugal clutch 276, the secondary centrifugal clutch effects its engagement and disengagement in correspondence to the rotational speed of the outer clutch 278, and accordingly, the rotational speed of the rotary shaft 261 of the electric motor 252. The primary centrifugal clutch 275 starts functioning in a rotational range slower than the rotation of the electric motor 252 at maximum efficiency and effects its engagement in a range exceeding a predetermined rotational speed. The secondary centrifugal clutch 276 starts functioning at a rotational speed slower than the rotational speed effecting the engagement of the primary centrifugal clutch 275 and effects its engagement in a range exceeding this rotational speed.

The terminal velocity deceleration mechanism 254 has a gear 271a secured to the input shaft 271 and gears 283a and 283b secured to an intermediate shaft 283 and a gear 284a secured to the output shaft 284. The gear 271a engages with the gear 283a and the gear 283b with the gear 284a. The input shaft 271 is rotatably supported by the casing 251 and the bearing element 257 and has the left end projecting inside the power transmission box 256 to be linked with the non-shift power transmission 253. The output shaft 284 projects through the right side of the casing 251 and fixed to the end of the rear wheel 14r.

The controller 449 as illustrated in FIG. 10 is structured with such elements as ECU. As shown in FIG. 10, the controller 449 is connected with the acceleration sensor 437, a speed sensor 438, a brake sensor 439, a voltage sensor 440 and the rotation sensor 470 described above and further with a gate drive circuit 441. The acceleration sensor 437 detects the angle of the acceleration grip. Similarly, the brake sensor 439 detects a manipulation of the brake pedal and the voltage sensor 440 detects a voltage of the batteries 436.

The controller 449 calculates and processes output signals from the sensors to output pulse width modulation signals (PWM control pulse signals) a, b, c, d, e, and f. As described below, this controller 449, judges the state of vehicle braking and outputs to the gate drive circuit predetermined PWM signals at the time of braking. The PWM signals have a duty factor corresponding to a vehicle speed and the angle of the acceleration grip at the time of normal driving (running without braking). The PWM signals, explained above, have a frequency exceeding twice the maximum frequency of an alternating current outputted by the electric motor in its regenerative operation as described below.

The gate drive circuit 441 is a step-up circuit and is connected to the batteries 436 and the driving circuit 464. This step-up circuit outputs driving signals to FET 435 of the driving circuit 464 in correspondence to PWM signals a, b, c, d, e, and f outputted from the controller 449 (represented with the same designations of PWM signals for convenience).

The driving circuit 464, as shown in FIG. 10, is structured with six FET 435 Y-connected thereto and wired between the positive and negative terminals of the batteries with the capacitor in parallel thereto. These FET have their gates connected to the gate drive circuit 441. A source of FET 435a is connected with a drain of FET 435d, a source of FET 435b with a drain of FET 435e, a source of FET 435c and a drain of FET 435f, and further, drains of FET 435a, 435b and 435c with the positive terminal of the batteries 436 and sources of FET 435d, 435e and 435f with the negative terminals of the batteries. These FET 435 are connected with diodes 442a, 442b, 442c, 442d, 442e and 442f set in the direction of easy flow in parallel thereto.

A regenerative brake device for electric motor vehicles, according to the present invention, operates as described below.

Figure 7:
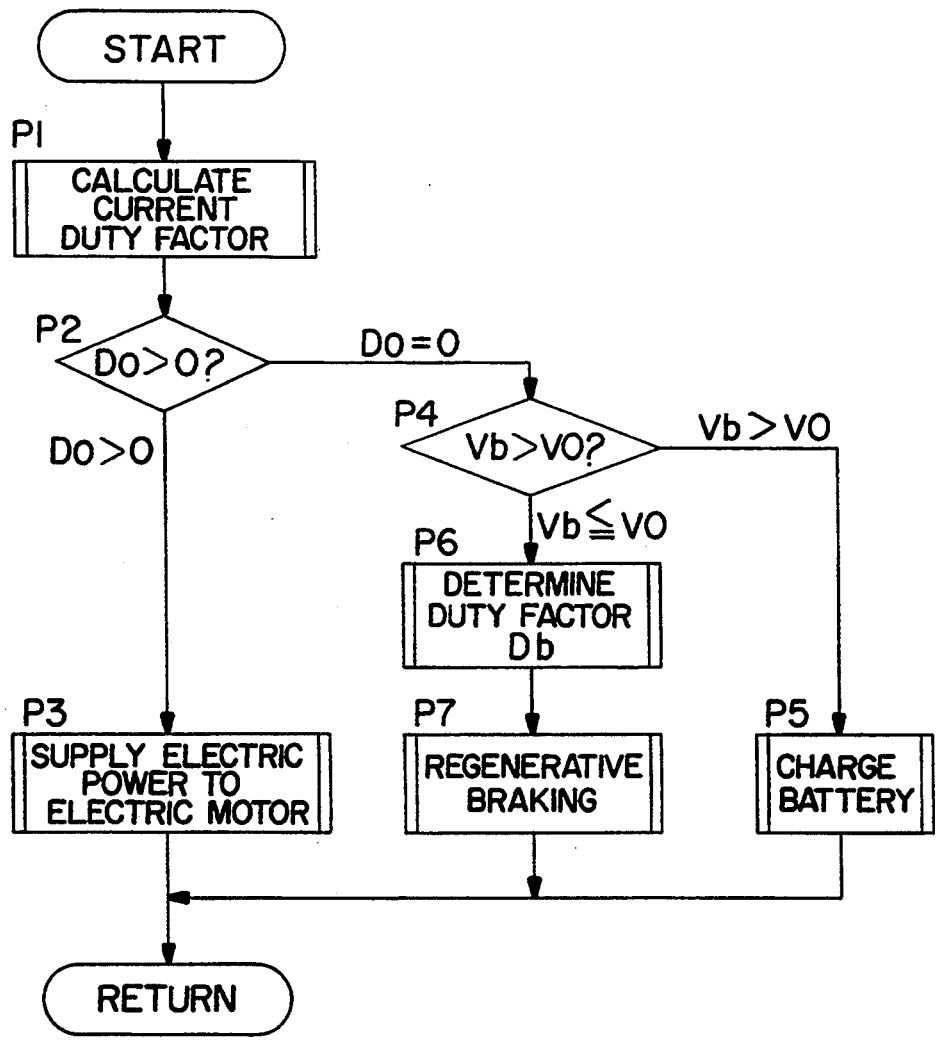
FIG. 7 is a flowchart showing the processing steps for the regenerative braking system of the present invention.

In this regenerative brake device, the electric motor is driven and controlled by repeated execution of the program shown in FIG. 7.

Firstly, a duty factor of a current output (Do) to the electric motor 52 during normal operation is calculated at step P1. This output duty Do has a value based on a deviation between a vehicle speed and the angle of the acceleration grip.

At the step P2, the output duty Do is judged to determine the state of vehicle braking based on its value. Step P2 judges that the vehicle is driving normally when the output duty Do is a positive value (Do>0) and executes step P3. If braking, the output duty Do is equal to zero (Do=0), and the present invention executes its step P4.

It may be added that step P2 can be replaced with a process to judge signals from the brake switch to detect the operation of the brake pedal.

At step P3, power is supplied to the electric motor or PWM signals a, b, c, d, e, and f are outputted to the gate drive circuit 441 with the duty factor of PWM signals a, b and c set at 1 and the duty factor of PWM signals d, e and f set at Do. The gate drive circuit 441 outputs driving signals to FET 435, in correspondence to PWM signals, to make FET 435 switch OFF and ON in correspondence to the received duty factor. Thus, the electric motor 52 has its stator coils supplying three-phase alternating current with a phase difference of 120 degrees therebetween.

At step P4, the current voltage of the batteries through the voltage sensor 440 is determined. Step P5 is executed when the battery voltage exceeds a predetermined current level and step P6 is executed when the voltage Vb drops below a predetermined voltage VO which is a criterion for determining the necessity for charging the batteries 436.

At Step P5, the controller 449 outputs the gate drive circuit 441 braking signals based on the duty factor of PWM signals a, b and c set at 0 and the duty factor of PWM signals d, e and f set at 1. In response to these signals, the motor drive circuit 464 switches on FET 435a, 435b and 435c and switches off FET 435d, 435e and 435f to supply power to the terminals of the stator coils 462. The power generated at these stator coils 462 has a phase deviation of 120 degrees. A charging current is blocked from flowing to the batteries 36, thereby preventing overcharging.

Figure 14:
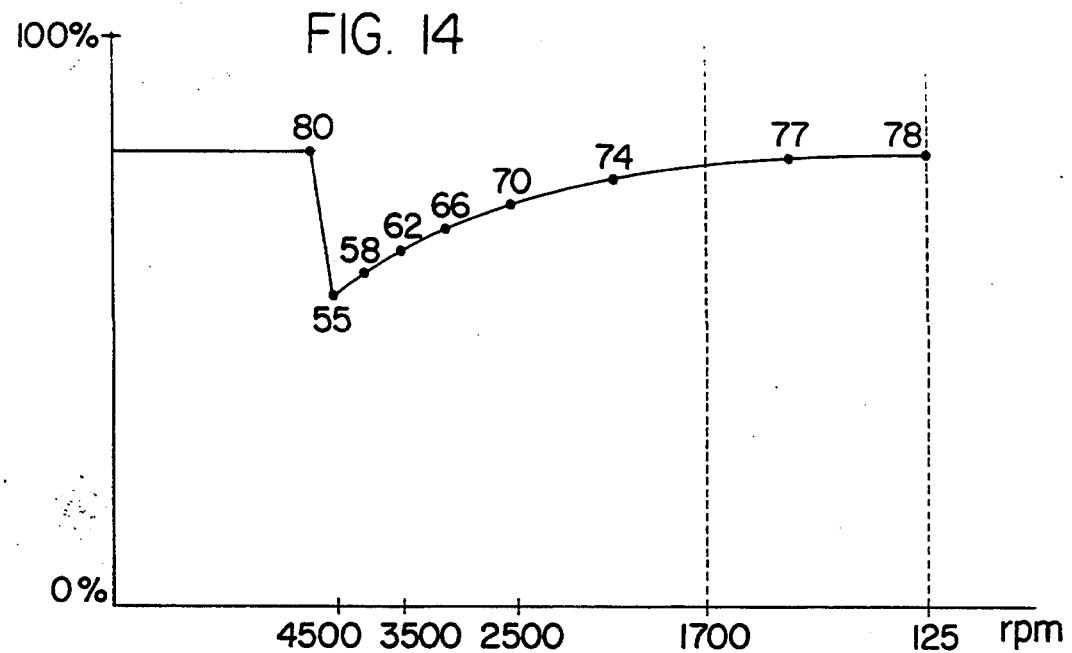
FIG. 14 illustrates duty factor characteristics of the control signals of the present invention.

Step P6 judges the rotational speed to the electric motor 252 through the rotation sensor 470 and determines a regeneration braking duty Db from a data table shown in FIG. 14 with the rotational speed of the electric motor 252 being an address. As a deceleration torque, the regenerative braking duty Db as a parameter presents characteristics relative to the rotational speed of the electric motor 252. The data table shown in FIG. 14 sets the characteristics of the deceleration torque gradually approaching a regulative torque as the motor 252 increases its rotation.

A regulative torque shown in FIG. 16 is set as a maximum transmission torque allowed for the power transmission without causing abnormality to such a power transmission as the non-shift power transmission 253.

Next, Step P7 is executed to effectuate regenerative braking. The regenerative braking is carried out with the duty factor of PWM signals a, b and c set at 0 and the duty factor of PWM signals d, e and f at the level of Db. Thus, the motor drive circuit 464 switches on FET 435a, 435b and 435c and switches OFF and ON FET 435d, 435e and 435f in response to the regenerative braking duty Db to charge the batteries 436 with power generated at the electric motor 252 and decelerate the vehicle with a deceleration torque corresponding to the regenerative braking duty and the rotation of the electric motor 252.

Figure 15:
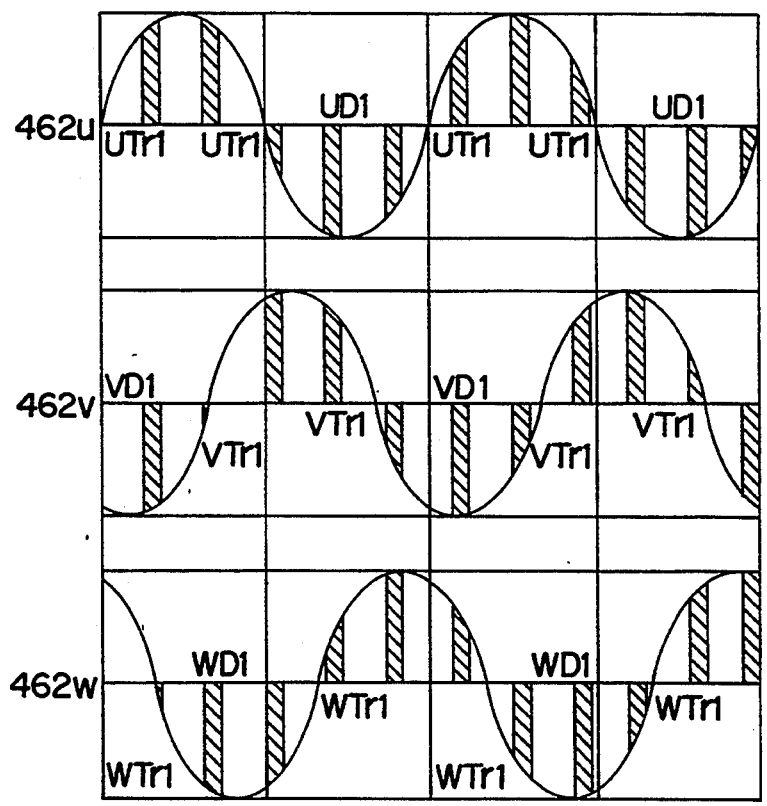
FIG. 15 illustrates the electrical power generated by the electric motor.

As shown in FIG. 15, a sine-wave current is generated by the stator coils 462u, 462v and 462w of the electric motor 252. PWM signals have a frequency twice as high as the maximum frequency of an alternating current generated by the electric motor 252 and a phase relative to the current as shown in the drawing. Therefore, the stator coils 462u, 462v and 462w have equal heat generation.

At the time of regenerative braking, the deceleration torque, as clear from FIGS. 16 and 14, has a maximum value regulated to a value less than the torque over, so that the belt 274 can be prevented from accidental jamming in the non-shift power transmission 253. Since the deceleration torque increases as the electric motor 252 increases in rotational speed, the braking performance of the electric motor can be raised in high-speed rotation, which in turn, keeps maintain good driveability even when a brake is applied.

The electric motor 252 and the rear wheel 14r have provided in parallel thereto the primary clutch 275, which corresponds to the rotational speed of the electric motor 252, and the secondary clutch 276 which responds to the rotational speed to the rear wheel 14r. The primary clutch 275 effects its engagement in a range exceeding the maximum rotation speed of the electric motor 252 as its start-up criterion and the secondary clutch 276 effects its engagement in a range exceeding a rotational speed slower than the primary clutch's start-up criterion. This enables the electric motor 252 to drive efficiently and to save power, as well as, recycle the vehicle kinetic energy efficiently at the time of braking.

Figure 8A:
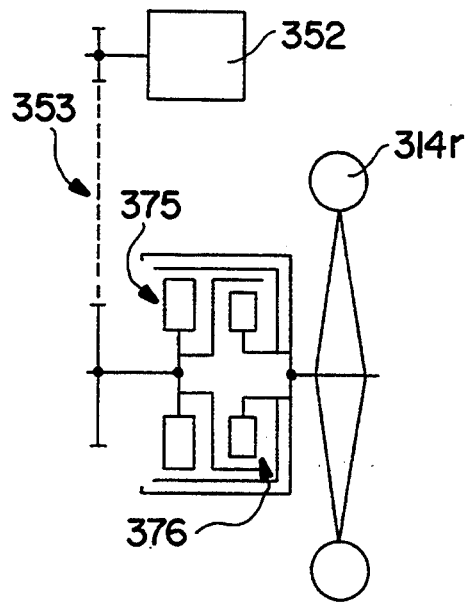
FIG. 8(A) 8(B), 8(C), 8(D), and 8(E) illustrate various embodiments of the primary elements of the regenerative braking system of the present invention.
Figure 8B:
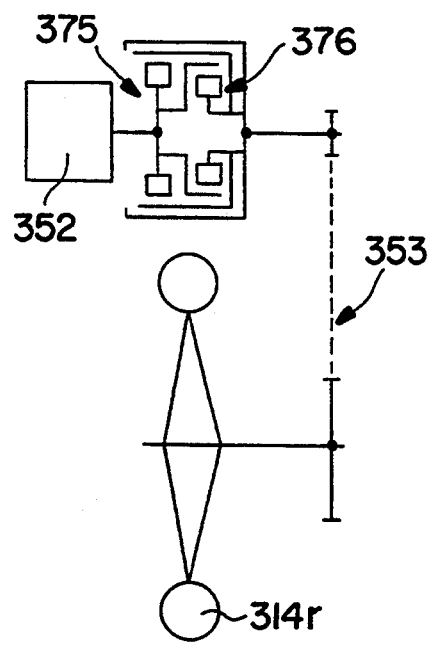
Figure 8C:
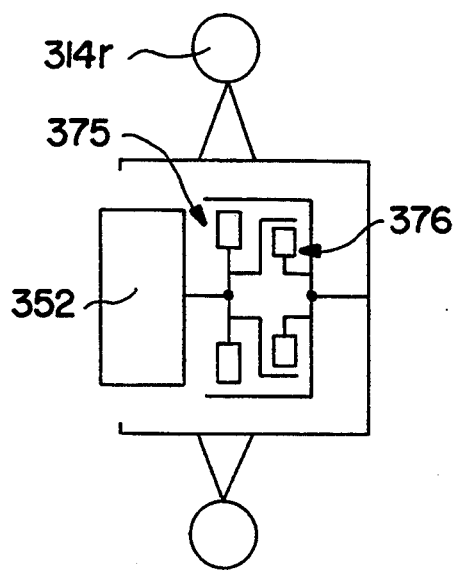
Figure 8:
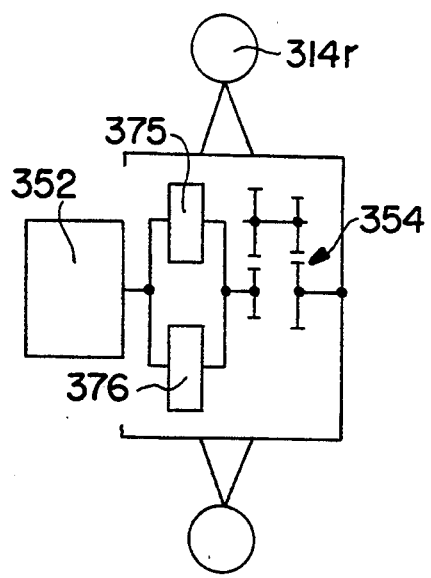
Figure 8:
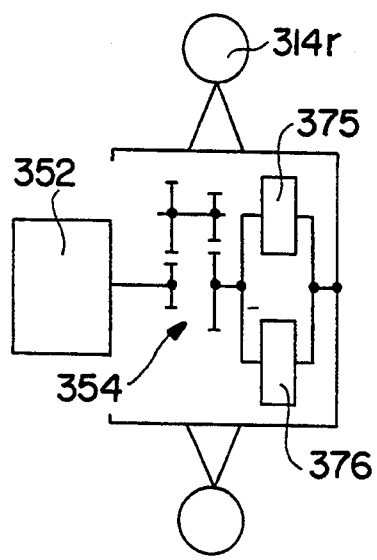

As shown in FIG. 8(A), the primary clutch 375 and secondary clutch 376 can be assembled to the rear wheel 314r. It is also possible to set the clutches 375 and 376 to the electric motor 352 as shown in FIG. 8(B). These clutches 375 and 376 may also be assembled to the rear wheel 314r together with the electric motor 352. It is further possible to assemble the clutch 375 and 376 to the rear wheel 314r with the terminal velocity deceleration mechanism 354. In the above structure setting the clutch with the terminal velocity deceleration mechanism 354, it is possible to provide the terminal velocity deceleration mechanism 354 between the clutches 375 and 376 and the electric motor 352 as shown in FIG. 8(D), and the terminal velocity deceleration mechanism 354 between the clutches 375 and 376 and the rear wheel 314r.

Figure 9:
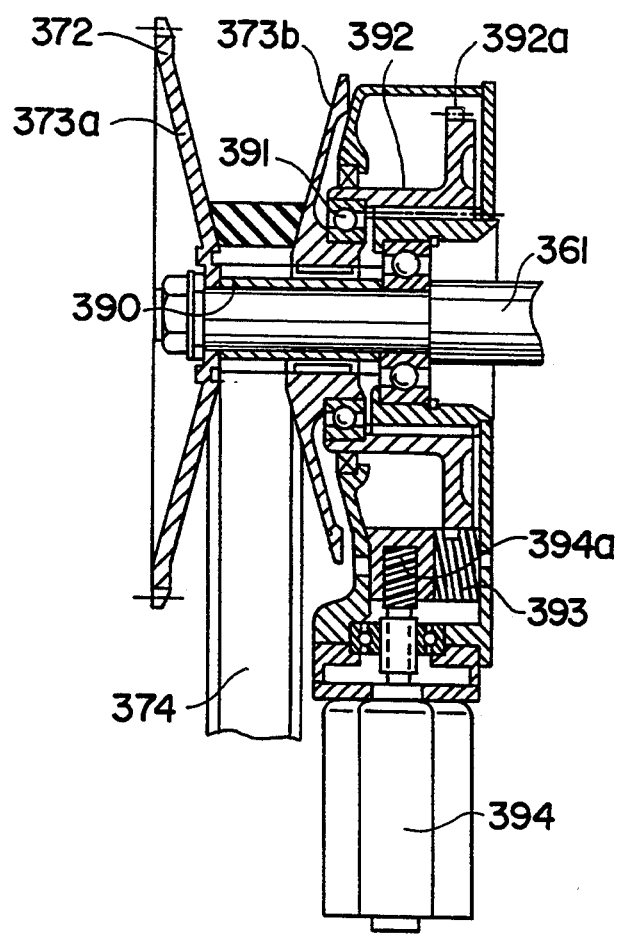
FIG. 9 illustrates one embodiment of the primary and secondary clutches of the present invention.

Shown in FIG. 9 is another embodiment of the present invention of which elements and parts equivalent to those of the above-described embodiment are represented with the same tens and one digits without duplicated explanations thereof.

This embodiment employs a motor 394 provided to the non-shift power transmission 353 as an actuator to shift a transmission ratio and control the transmission ratio of the non-shift power transmission 353 with this motor 394.

As shown in FIG. 9, the rotary shaft 361 of the electric motor 352 has provided thereover a sleeve 390 on which the movable face gear 373b of the driving pulley 372 is supported slidably in its axial direction. The movable face gear 373b receives a worm element 392 engaged therewith through the bearing 391 rotatably against each other in their respective rotational direction and integrally slidably in their axial direction.

The worm element has formed thereon a gear section 392a which engages with the intermediate gear 393. The intermediate gear 393 receives engaged therein a worm element 394a securely fitted to the rotary shaft of an electric motor 394. Connected to a drive circuit, this electric motor 394 is driven by control signals output from the controller 449.

In this embodiment of the present invention, the belt-strapping diameter of the driving pulley 372 is made to decrease in correspondence to the deceleration of vehicle driving at the time of regenerative braking to decelerate the non-shift power transmission 353, and accordingly, gradually increase a rotational speed transmitted from the driven pulley 373 to the driving pulley 372. When the vehicle slows down, the rotary shaft 361 of the electric motor 352 is kept at a high-speed rotation, realizing high efficiency in braking regeneration and efficiently recovering the kinetic energy of the vehicle.

According to the present invention, as described above, the duty factor of control pulse signals are set low when the electric motor is rotating at a high speed to increase its braking power within a range not exceeding a predetermined value, thereby presenting good braking performance which does not impair driveability and making it possible to gain great braking power in high-speed driving of the vehicle.

Also, according to the present invention, as described above, the power transmission system is provided with the primary clutch to respond to the rotation of the electric motor which effects its regenerative braking without failure when the electric motor is rotating at a high speed, and therefore, makes it possible to recover the kinetic energy of the vehicle.

The present invention has, in parallel to the primary clutch, the secondary clutch to provide engagement at a rotation speed slower than that of the primary clutch, so that the kinetic energy of the vehicle can be efficiently recovered when a brake is applied.

Further, according to the present invention, as described above, the non-shaft power transmission effects regenerative braking while decelerating, realizing enough power generation when the vehicle slows down and making it possible to recover the kinetic energy of the latter efficiently.

Figure 2:
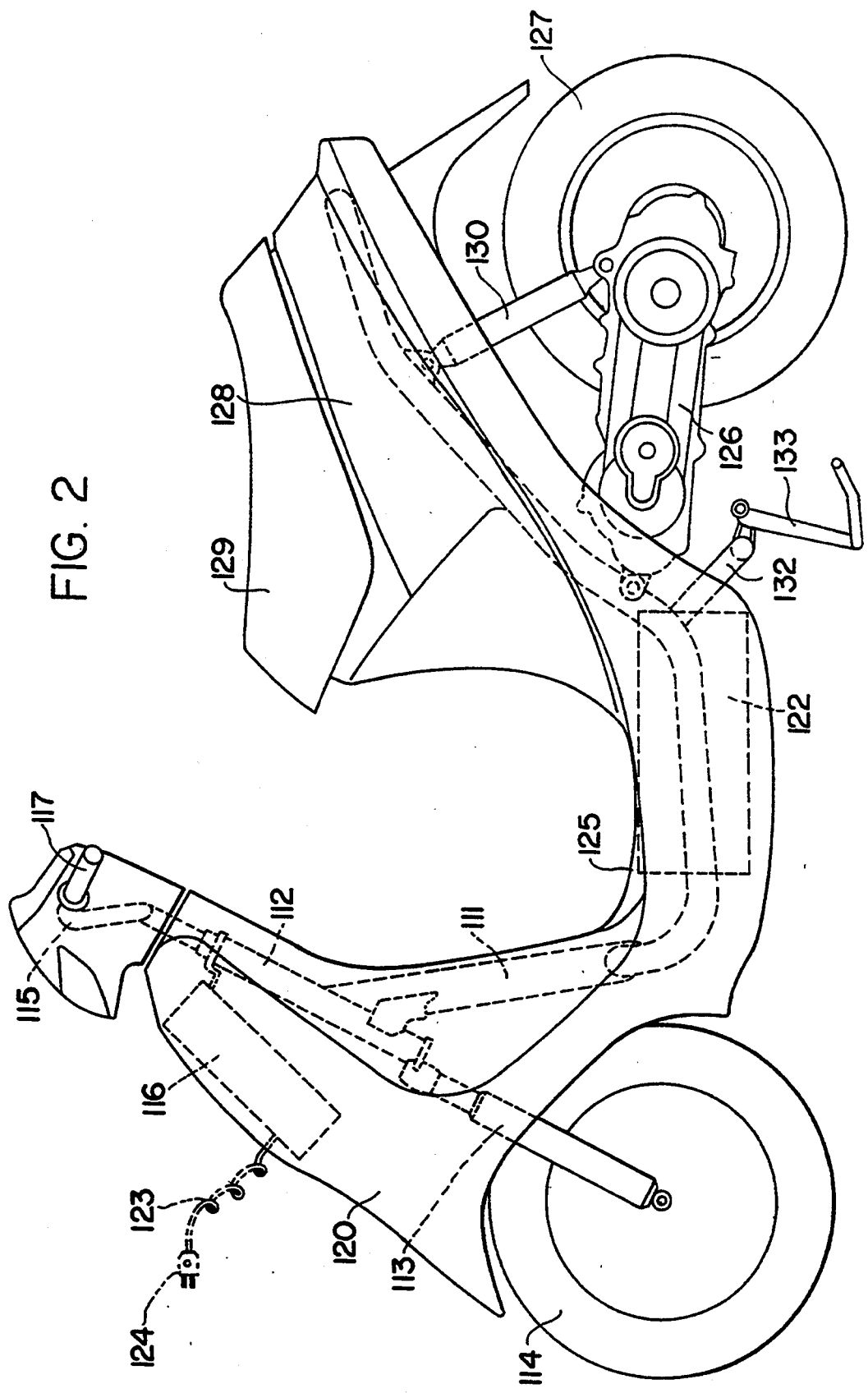
FIG. 2 is a side view of an electric motor vehicle employing the transmission system of the present invention.
Figure 3:
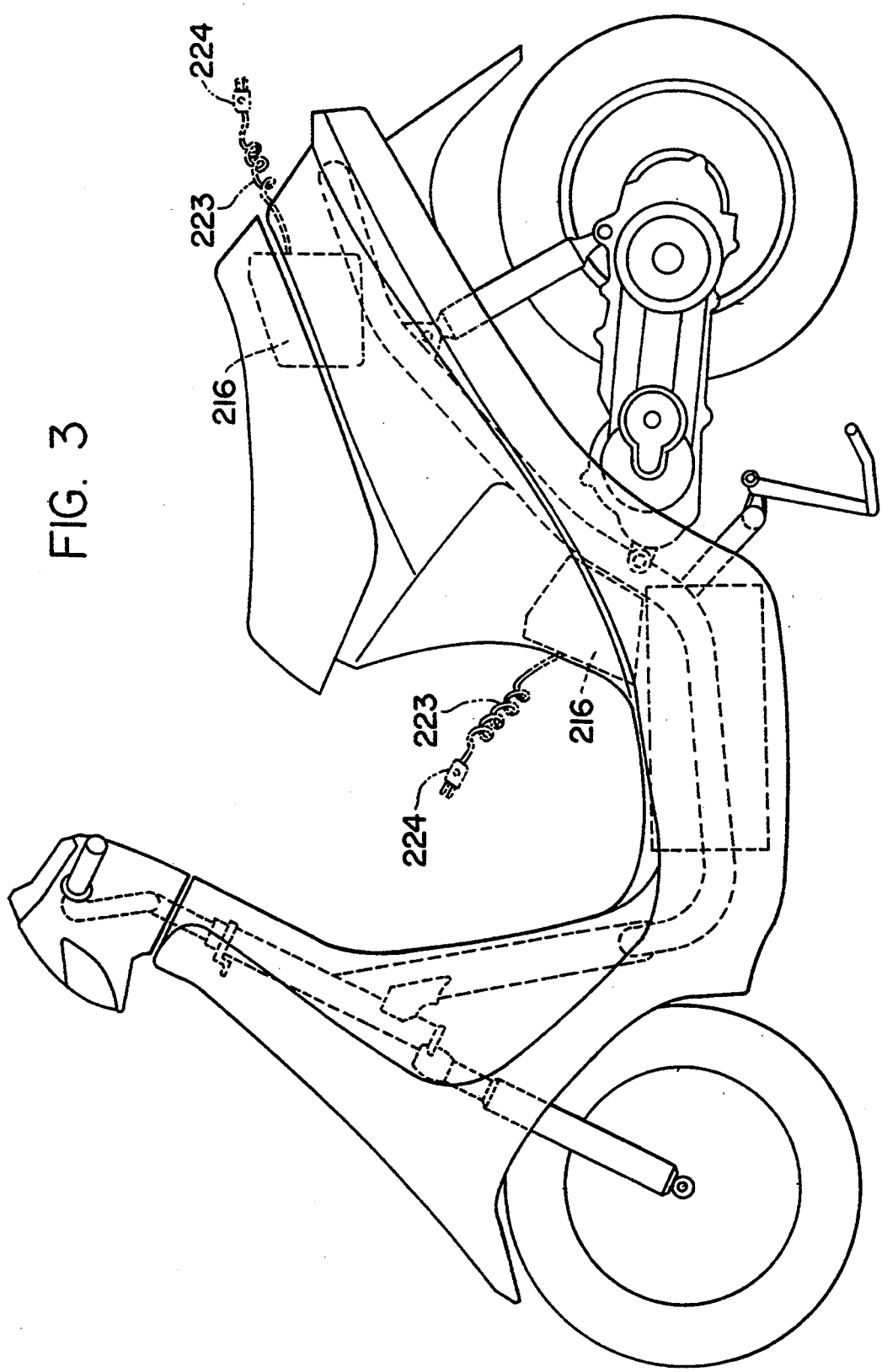
FIG. 3 is a side view of another embodiment of FIG. 2.

In FIG. 2, a vehicle frame 11 extends back and forth in a form almost like a letter "U" as seen from its sides. The vehicle frame 111 has securely fixed to its front section a head pipe 112 which, in turn, supports a front wheel 114 fixed thereto with a front fork 113 to be manipulated by a handlebar 115. At its front section, the front pipe 114 has secured thereto a control box 116. The handlebar has an acceleration grip 117, a sensor 118 to detect the angle of the handlebar and a switch 519 (FIG. 11) to detect the handlebar at its minimum angle. The sensor and switch are wired to the control box 116 which has its front section covered with a front cover 120 and houses a controller 521 (FIG. 11) and a charging circuit as described below. The charging circuit is connected to a battery 122 described below with an electric cord 123 of an adequate length provided with a plug 124 which, when plugged to a commercial power receptacle, serves to charge the battery 122. The front cover has formed therein an air intake opening (not shown) leading to inside the control box 116 to taken in air during driving.

Figure 11:
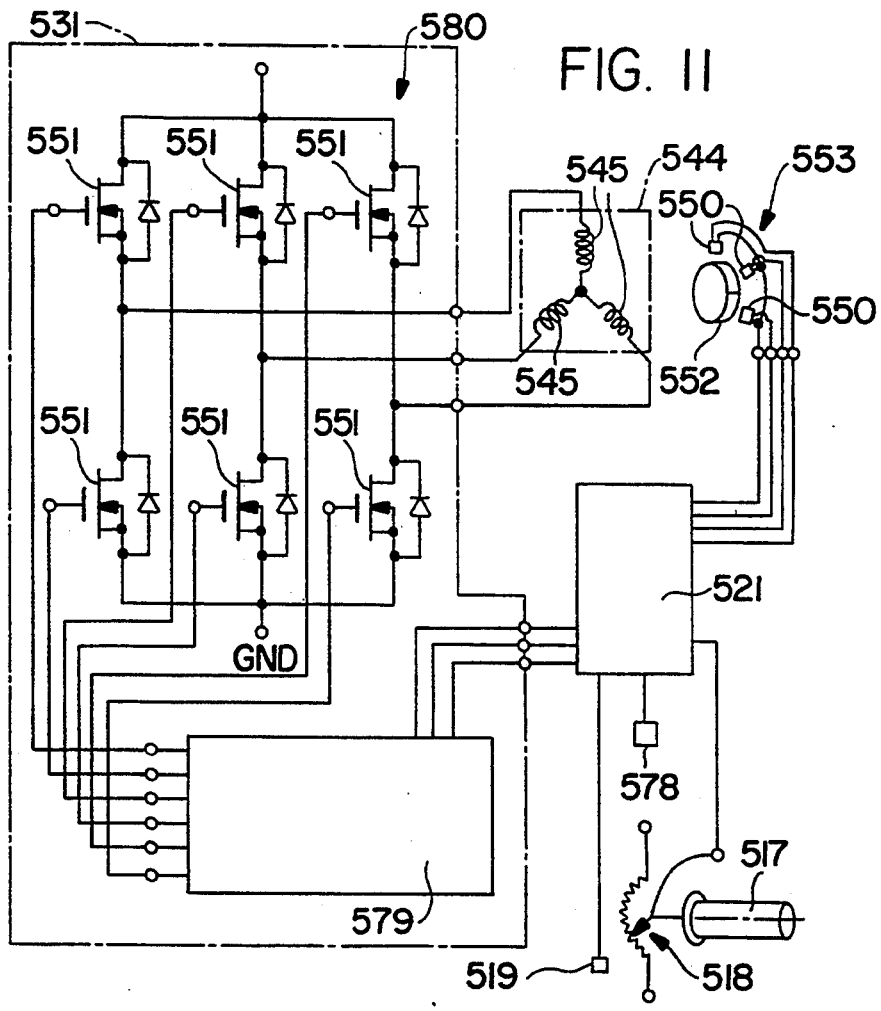
FIG. 11 illustrates the circuit diagram for the transmission system of the present invention.

The vehicle frame 111 has securely provided at its central section a floor panel 125 under which it has the battery 122 detachably provided. The vehicle frame 111 supports, behind the battery 122, a swing unit 126 which is free to swing and supports a rear wheel 127. The rear section is covered with a rear cover 126 having a sheet 129 built thereover. The swing unit 126 has a cushion unit 130 suspended between its rear section and the vehicle frame 122. The battery 122 is wired to the controller 521 (FIG. 11) and charging circuit and a driving circuit 531 (FIG. 11) described below to supply power to the controller 521 (FIG. 11) and the driving circuit 531 (FIG. 11). A cross member 132 is secured to the vehicle frame 111 behind the position of the battery 122 and extends downwardly in a substantially oblique direction. This cross member 132 supports a stand 133 and serves to protect the rear section of the battery 122.

Figure 5:
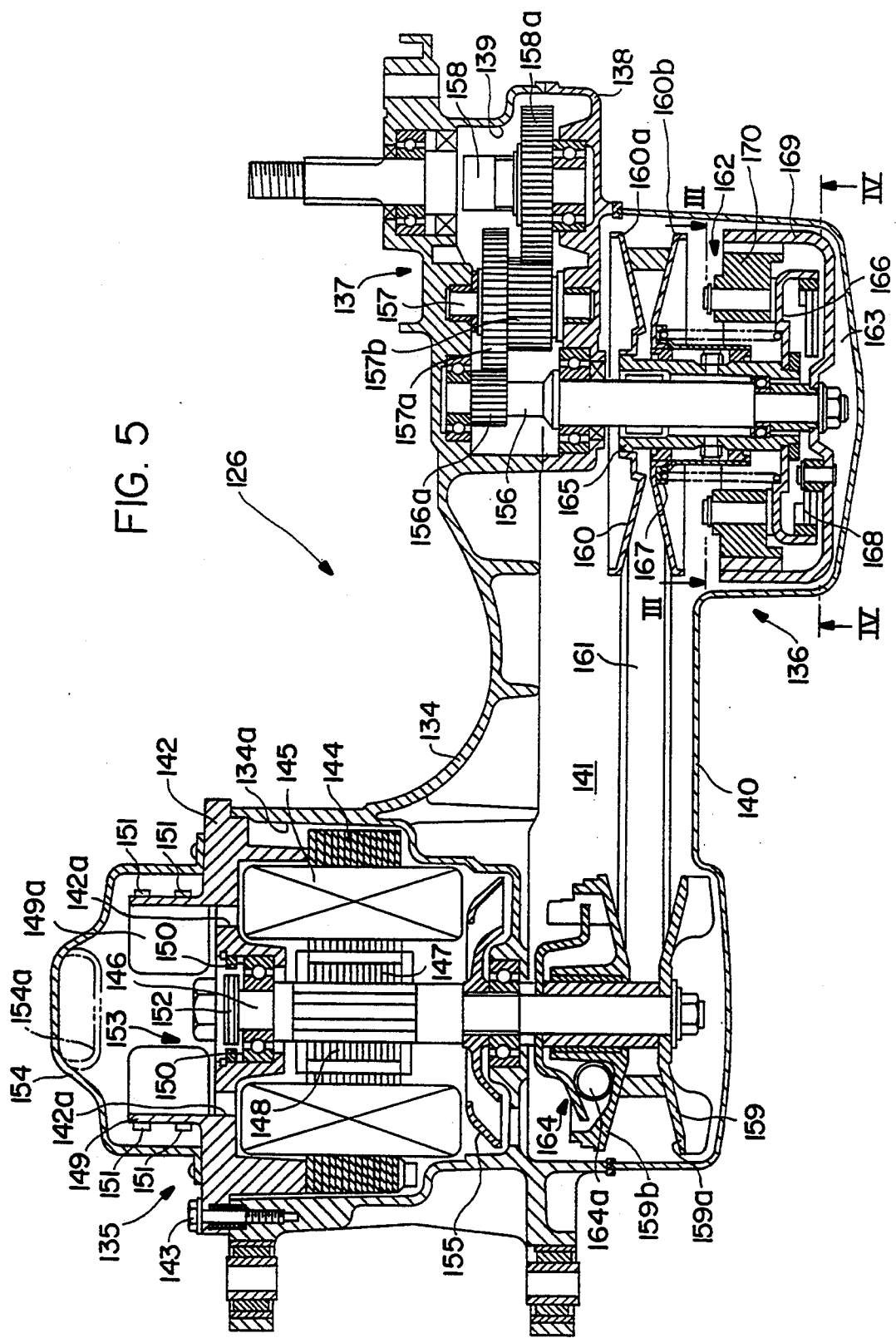
FIG. 5 is a cross-sectional view of another embodiment of the transmission system of the present invention.

The swing unit 126 extends back and forth. It is fixed to the vehicle frame 111 in a manner to allow its swing movement with a pivot shaft (not shown) and support the rear wheel 127 at its rear end. As shown in FIG. 5, this swing unit 126 is structured with a casing 134 having set therein a direct-current motor 135, a belt-driven non-shift transmission 136 and a terminal velocity deceleration mechanism 137. It has a recess 134a formed at the right-side front section to house in a motor 135 and has a bearing element 138 provided to the left-side rear section to form a gear box 139 to receive in the terminal velocity deceleration mechanism 137 and a cover 140 fitted to the left-side section to form a transmission box 141 to house therein the belt-driven non-shift transmission 136.

The direct-current motor 135 has a substantially disk-shaped stator housing 142 fitted in the recess 134a of the casing 134 through the opening of the latter and secured to the casing 134 with a bolt 143. The stator housing 142 houses on the left surface three coils 145 constituting a stator 144 securely set inside the recessed 134a and holds a rotor 148 having its shaft 146 passing through the bottom surface of the recess 134a and rotatably supported between the bottom surface and the stator housing 142 with a permanent magnet 147 at the center. The stator housing 142 has on the right surface the coils 145 pre-assembled therein and a heat sink 149 integrally formed therewith. At the center, the stator housing has a plurality of hole elements 150 formed around the shaft 146 having the right end rotatably passing therethrough. The heat sink 149 has provided on the circumference the driving circuit 132 covered with a cover 154. As described below, the driving circuit 131 has six FET 151 which are connected to three terminals of the Y-wired coils 145. The hole elements 150 are positioned to face a magnet 152 of the shaft 146 described below to constitute a rotational angle sensor 553 which is wired with the controller 521 to detect a rotational angle of the shaft 146 with the magnet 152.

The shaft 146 has around the circumference of the right end the magnet 152 with the magnetic poles aligned in the circumferential direction opposite to the hole elements 150, a fan 155 provided on the left of the rotor 148 and the left end projecting inside the transmission box 141 to be linked with the non-shift transmission 136. The fan 155 rotates integrally with the shaft 146 to taken in ambient air through an opening 154a formed to the cover 154. Thus taken in, ambient air flows into the transmission box 141 through a ventilation hole 142a formed in the stator housing 142 and a ventilation hole 134b formed to the recess 134a of the casing 134 at the bottom of the latter to be let out from the transmission box 141 through a ventilation hole formed to the cover 140.

The direct-current motor 135 is easy to assemble as a motor casing can be structured with the wall of the recess 134a formed in the casing 134 receiving fitted into the recess 134a of the casing 134 the stator housing 142 pre-assembled with the stator 144. Thus requiring fewer components and structural elements, the motor can be made light in weight and low in cost.

The terminal velocity deceleration mechanism 137 has a gear 156a fitted to an input shaft 156, gears 157a and 157b fitted to an intermediate shaft 157 and a gear 158a fitted to an output shaft 158. Said gears 156a and 157a and gears 157b and 158a are engaged with each other. The input shaft 156 projects into the transmission box 141 through the bearing element 138 to have the left end linked with the non-shift transmission 136. The output shaft 158 projects rightwardly to pass through the casing 134, and serving as a wheel shaft, supports the rear wheel 127 fitted to the right end with bolts and nuts (not shown). This terminal velocity deceleration mechanism 137 reduces and transmit power from the motor 135 to the rear wheel through the non-shift transmission 136.

The non-shift transmission 136 suspends a belt 161 between a driving pulley 159 and a driven pulley 160 and links the driving pulley 159 to the shaft 146 and the driven pulley 160 to the input shaft 156 through a primary centrifugal clutch 162 and a secondary centrifugal clutch 163 connected in parallel. The driving pulley 159 is structured with a fixed face gear 159a fitted to the left end of the shaft 146 and a movable face gear 159 to the shaft 146 slidably in its axial direction. The movable face gear is driven by a pressure regulator mechanism 164 provided with a weight 164a and shifts in its axial direction. This driving pulley 159 changes the diameter of the belt 161 in its wound-around section in correspondence to the rotation of the shaft 146. Mounted on a sleeve 165 receiving the input shaft 156 inserted slidably thereinto, the driven pulley 160 has a fixed face gear 160a fixed to the right end of the sleeve 165 shiftably in its axial direction. This driven pulley 160 has the movable face gear 160b energized towards the fixed face gear 160a under the influence of a spring pressed in an outer clutch 166 of the secondary centrifugal clutch 163 and shifting in correspondence to the belt changing in its wound-up diameter around the driving pulley 159 and changing the belt in the diameter of its wound-up diameter therearound.

The secondary centrifugal clutch 163 is structured with the outer clutch 166 fitted to the left end and an inner clutch 168 mounted to an outer clutch 169 of the primary centrifugal clutch 162 to engage with and disengage from the latter in correspondence to the rotation of the outer clutch 169 of the primary centrifugal clutch 162. The primary centrifugal clutch 162 is structured with the outer clutch 69 fitted to the input shaft 156 and an inner clutch 170 of the secondary centrifugal clutch 163 to engage with and disengage from the latter in correspondence to the rotation of the outer clutch 165 of the secondary clutch 163. As shown in FIG. 12(B), the secondary centrifugal clutch 163 supports the outer clutch 169 of the primary centrifugal clutch 162 two substantially U-shaped arms 672 provided with butts 671 frictionally contacting with the outer clutch 166 and weights 673 mounted at the top and springs 674 provided in suspension between the arms 672 to energize the butts 671 in the direction away from the outer clutch 166.

Figure 12A:
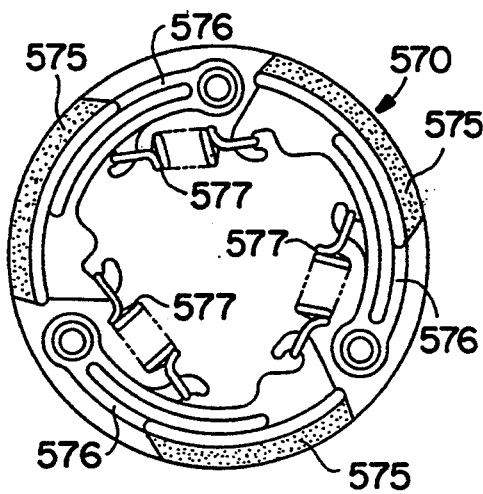
FIGS. 12(A) and 12(B) illustrate cross-sectional views taken along lines IV—IV and III—III, respectively, of FIG. 5.
Figure 12B:
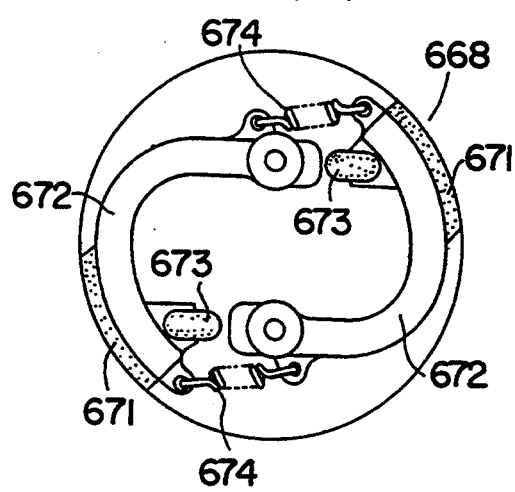

Similarly, the inner clutch 570 of the primary centrifugal clutch 162, as shown in FIG. 12(A), supports the outer clutch 166 of the secondary centrifugal clutch 163 with three circular arms 576 having securely fixed thereto butts 575 frictionally contacting with the outer clutch 169 and springs 577 provided in suspension between the arms 576 to energize the butts 575 in the direction away from the outer clutch 165. The secondary centrifugal clutch 163, working in correspondence to the outer clutch 169 of the primary centrifugal clutch 162, and accordingly, the rotation of the input shaft 156, serves to link the sleeve 165 and the input shaft 156 when the rotation of the input shaft 156 exceeds a predetermined rotational speed. The primary centrifugal clutch 162, working in correspondence to the outer clutch 166 of the secondary clutch 163, and accordingly, the rotation of the sleeve 165, serves to link the sleeve 165 and the input shaft 156 when the rotation of the sleeve 165 exceeds a predetermined rotational speed faster than the predetermined rotational speed of the secondary centrifugal clutch 163.

For instance, the predetermined rotational speed for the primary centrifugal clutch 162, as described above, is set slightly slower than the rotation of the motor 135 for maximum efficiency, and the predetermined rotational speed for the secondary centrifugal clutch 163 is about 400 r.p.m. slower than the predetermined rotation for the primary centrifugal clutch 162.

As shown in FIG. 11, the controller 521 is connected to the acceleration sensor 518, switch 519, brake switch and motor rotational angle sensor 353, as described above, a vehicle speed sensor (not shown) and the driving circuit 531. Provided with a microcomputer, the controller 521 determines a duty factor for supplying power to the motor based on output signals from the acceleration sensor 518 and the vehicle speed sensor; and based on output signals from the rotation and angle sensors 353 for the motor, determines a phase for alternating the magnetic fields of the coils 545 and sends to the driving circuit 531 PWM output signals representing the duty factor and phase of the coils. Lastly, depending on the damping based on output signals from the switch 519 and the brake switch 578, the controller 521 outputs damping signals to the driving circuit 31 when damping is in effect.

The driving circuit 531 has a switching circuit 580 and a gate drive circuit 579 connected to the controller 521 and the coils 545, respectively. The switching circuit 580 has provided, in parallel between the battery 522 and ground, three pairs of serially-connected FET 551. The FET 551 each have a gate connected to the driving circuit 579 and source-drain connections of the FET 551 for each pair are connected to the three terminals of the Y-connected coils. This driving circuit 531, based on PWM signals outputted from the controller 521, switches on and off FET 551 to supply power to the motor 135 to generate alternating magnetic fields in the coils 545. When damping signals are outputted from the controller 521, the terminals of the coils 545 are connected with FET 551 to allow the motor 135 to effect its electric damping.

In the above-described embodiment of the present invention, the charging circuit is provided in front of the head pipe 512 together with the controller 521. However, it is possible to position it beneath the sheet 129 or under the front end of the sheet 129, either separately or together with the controller 521.

The electric motorbike embodying the present invention is driven to run with its rear wheel linked with the motor 131 through the non-shift transmission 136, centrifugal clutches 162 and 163 and terminal velocity decelerator mechanism 137 and the motor energized by a direct current with a duty factor corresponding to an operation angle of the acceleration grip 117 and a vehicle speed. The primary centrifugal clutch 162 and the secondary centrifugal clutch 163 are positioned in parallel with each other within a power transmission area between the motor 135 and the rear wheel 127. The primary centrifugal clutch 162, when the power of the motor 135 is transmitted to the driven pulley 160, causes non-shift power transmission 136 to engage when the rotation of the driven pulley 160 exceeds the predetermined speed set in the vicinity of the rotation of the motor at maximum efficiency. Meanwhile, the secondary centrifugal clutch 163, when the power is transmitted from the rear wheel 127 to the non-shift transmission 136, engages when the rotation of the input shaft 156 exceeds the predetermined speed set slower than the predetermined rotational speed of the primary centrifugal clutch 162. Thus, it is possible to, as described in the Japanese Patent Application Laid-Open No.

1-181496 filed on Jul. 13, 1989, keep the motor 135 at maximum efficiency when the vehicle is starting-up by linking the latter to the rear wheel 127 through the primary centrifugal clutch rear wheel 127 through the primary centrifugal clutch 162 and keep the motor low in power consumption and heat generation.

When a torque is generated to the rear wheel 127 through the secondary clutch 163 engaged therewith at the time of deceleration and damping, the torque is transmitted to the motor 135 to allow the latter to serve as a load. The secondary centrifugal clutch 163 has the predetermined rotation speed set slower than the predetermined rotation of the primary centrifugal clutch 162 and the secondary centrifugal clutch 163 remains engaged after the primary centrifugal clutch 162 disengages itself during deceleration and damping, leading to smooth deceleration and driveability. In the above-described embodiment of the present invention in particular, controlling of a driving speed is effected by electric damping of the motor 135, which results in excellent damping performance.

Figure 4:
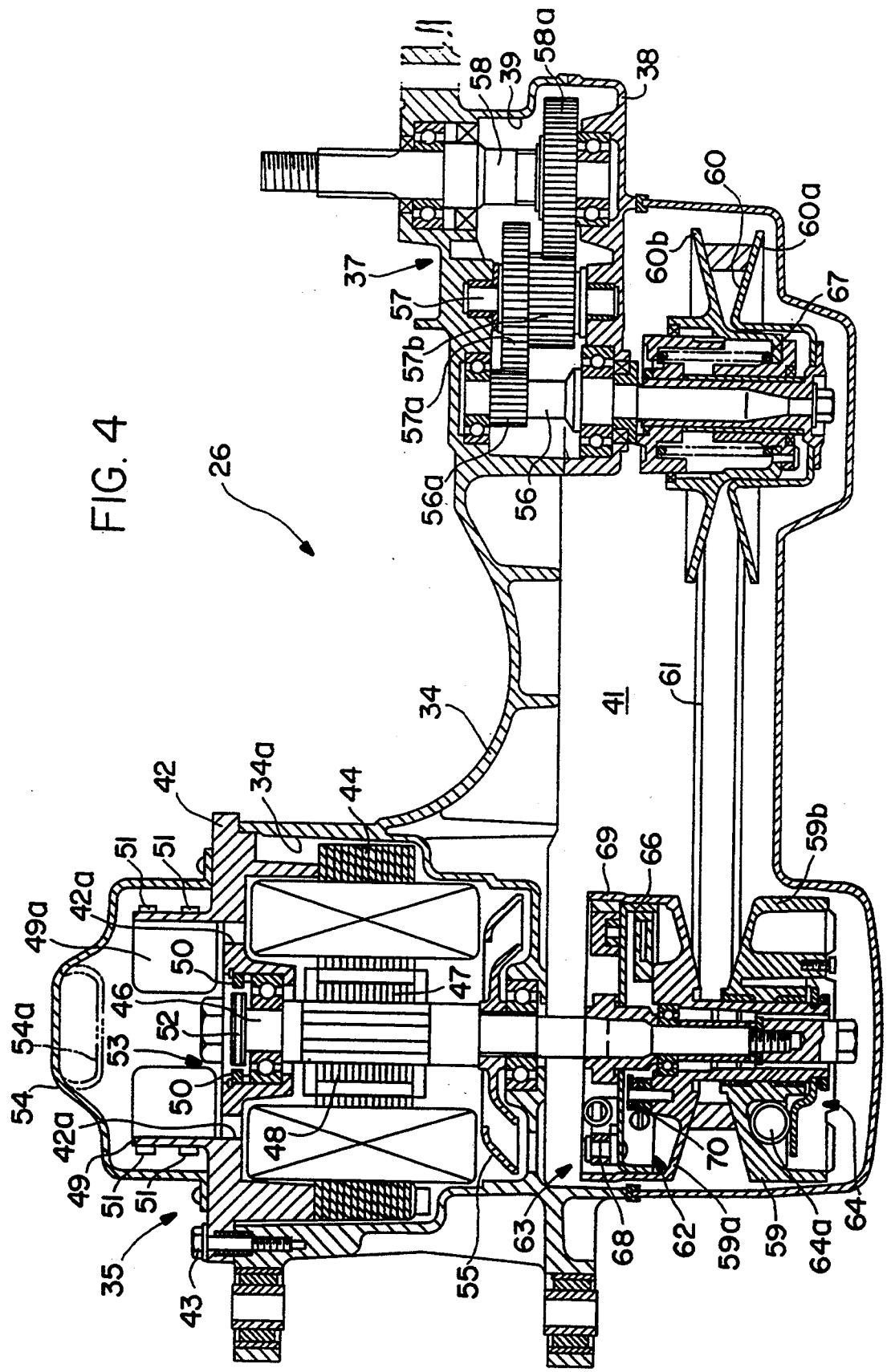
FIG. 4 is a cross-sectional view of one embodiment of the transmission system of the present invention.

FIG. 4 illustrates another embodiment of the present invention of which elements and parts equivalent to those of the above-described embodiment are represented with the same tens and ones digits without duplicated explanations thereof.

This embodiment of the present invention includes the outer clutch 66 of the secondary centrifugal clutch 63 fixed to the shaft 46 of the motor 35 and rotatably supports the driving pulley 59 of the non-shift power transmission 36 to the shaft 46. The outer clutch 69 of the primary centrifugal clutch 62 is formed integrally with the fixed face gear 59a of the driving pulley 59 with the fixed face gear 59a having fitted thereto the inner clutch 68 of the secondary centrifugal clutch 63.

In this embodiment, it is possible to keep the motor 35 at maximum efficiency at the time of vehicle start-up by transmitting the power of the motor 35 to the rear wheel 27 through the primary centrifugal clutch 62. When a torque is generated to the rear wheel 27 with the second clutch 63 engaged therewith at the time of deceleration and damping, the torque is transmitted to the motor through the secondary centrifugal clutch 63 during slow rotation, thereby realizing smooth and comfortable driving.

Figure 13:
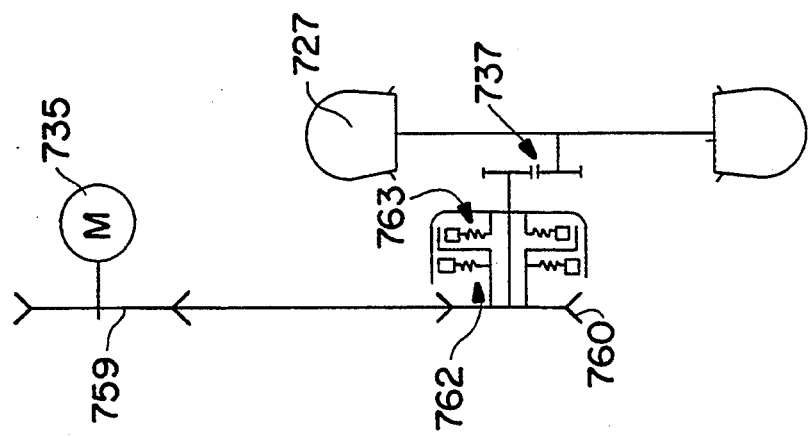
FIGS. 13(A) and 13(B) illustrate various embodiments of the transmission system of the present invention.
Figure 13:
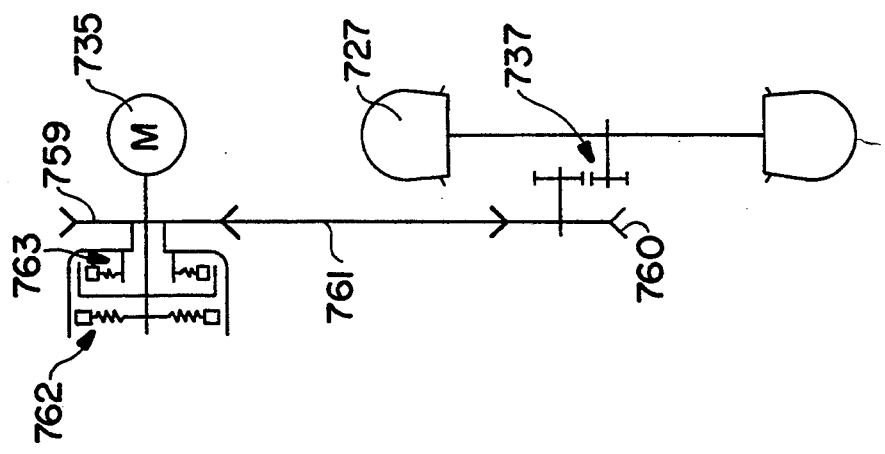

It is needless to say that the present invention is not limited to the embodiments described above and it is possible to, for example, provide the primary centrifugal clutch 62 and the secondary centrifugal clutch 63 as shown in FIGS. 13(A) and 13(B).

As described above, a power transmission device for motor vehicles according to the present invention enables the motor driving a driving wheel to run highly efficiently with low electric power consumption and heat generating during normal driving and serve as a load to effect deceleration and damping of the vehicle during deceleration and damping, leading to comfortable driving.

Particularly, with controlling of a driving speed effected by electric damping by the motor 35, the present invention realizes excellent damping performance.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A regenerative brake device for an electric motor vehicle having a driving wheel, an electric motor, and a battery, comprising:
    battery charging means for charging the battery with electric power generated by the electric motor;
    control means, operatively connected to said battery charging means, for controlling when said battery charging means transfers electric power from the electric motor to the battery by generating control signals having a duty factor and for controlling braking power,
    said control means controlling said duty factor of said control signals to be set at a small value when a rotational speed of the electric motor is high and controlling said braking power to increase over a predetermined range without having said braking power exceed a predetermined braking power level as a rotational speed of the electric motor increases; and
    primary clutch means for disengaging the driving wheel from the electric motor when the rotational speed of the electric motor falls below a predetermined speed.

2. The regenerative brake device as claimed in claim 1, further comprising:
    secondary clutch means, connected in parallel with said primary clutch means, for engaging the driving wheel to the electric motor when the rotational speed of the electric motor falls within a predetermined range of rotational speeds, an upper end of said predetermined range of rotational speeds not exceeding said predetermined speed such that said predetermined range of rotational speeds is slower than said predetermined speed.

3. A regenerative braking system for providing braking power without impairing driveability due to excessive braking power, comprising:
    an electric motor;
    a driving wheel;
    power transmission means for connecting said electric motor to said driving wheel;
    a re-chargeable power source;
    charging means for charging said re-chargeable power source with electric power generated by said electric motor; and
    control means, operatively connected to said charging means, for controlling when said charging means transfers electric power to said re-chargeable power source by generating control signals having a duty factor and for controlling braking power;
    said control means controlling said duty factor of said control signals to be set at a small value when a rotational speed of said electric motor is high;
    said control means controlling said braking power to increase over a predetermined range without having said braking power exceed a predetermined braking power level as a rotational speed of said electric motor increases.

4. The regenerative brake device as claimed in claim 3, further comprising:
    primary clutch means for disengaging said driving wheel from said electric motor when the rotational speed of said electric motor falls below a predetermined speed.

5. The regenerative brake device as claimed in claim 4, further comprising:

secondary clutch means, connected in parallel with said primary clutch means, for engaging said driving wheel to said electric motor when the rotational speed of said electric motor falls within a predetermined range of rotational speeds, an upper end of said predetermined range of rotational speeds not exceeding said predetermined speed such that said predetermined range of rotational speeds is slower than said predetermined speed.

6. The regenerative braking system as claimed in claim 3, wherein said power transmission means provides a non-shift power transmission to allow regenerative braking through said charging means while shifting to a high deceleration ratio.

7. A power transmission for an electric motor vehicle having an electric motor and driving wheel, comprising:

primary clutch means for engaging the electric motor to the driving wheel to transmit a driving torque from the electric motor to the driving wheel when a rotational speed of the electric motor exceeds a predetermined primary rotational speed; and secondary clutch means, operatively connected in parallel with said primary clutch means, for engaging the electric motor to the driving wheel to transmit a driving torque from the electric motor to the driving wheel when the rotational speed of the electric motor exceeds a predetermined secondary rotational speed, said predetermined secondary rotational speed being slower than said predetermined primary rotational speed.

8. The power transmission as claimed in claim 7, wherein a difference between said predetermined primary rotational speed and said predetermined secondary rotational speed is 400 rotations per minute.

9. The power transmission as claimed in claim 8, further comprising a belt-driven non-shift transmission between the electric motor and the driving wheel.

10. The power transmission as claimed in claim 7, wherein the rotational speed of the electric motor is monitored and controlled by electrically-executed dampening of the electric motor.

11. The power transmission as claimed in claim 10, further comprising a belt-driven non-shift transmission between the electric motor and the driving wheel.

12. The power transmission as claimed in claim 8, further comprising a belt-driven non-shift transmission between the electric motor and the driving wheel.

13. A power transfer system for an electric motor vehicle, comprising:
an electric motor;
a re-chargeable power source connected to said electric motor;
a driving wheel; and
transmission means for connecting said electric motor to said driving wheel;
said transmission means including,
primary clutch means for engaging said electric motor to said driving wheel to transmit a driving torque from said electric motor to said driving wheel when a rotational speed of said electric motor exceeds a predetermined primary rotational speed, and
secondary clutch means, operatively connected in parallel with said primary clutch means, for engaging said electric motor to said driving wheel to transmit a driving torque from said electric motor to said driving wheel when said rotational speed of said electric motor exceeds a predetermined secondary rotational speed, said predetermined secondary rotational speed being slower than said predetermined primary rotational speed.

14. The power transfer system as claimed in claim 13, wherein a difference between said predetermined primary rotational speed and said predetermined secondary rotational speed is 400 rotations per minute.

15. The power transfer system as claimed in claim 14, wherein said transmission means further includes a belt-driven non-shift transmission between said electric motor and said driving wheel.

16. The power transfer system as claimed in claim 13, wherein said rotational speed of said electric motor is monitored and controlled by electrically-executed dampening of said electric motor.

17. The power transfer system as claimed in claim 16, wherein said transmission means further includes a belt-driven non-shift transmission between said electric motor and said driving wheel.

18. The power transfer system as claimed in claim 13, wherein said transmission means further includes a belt-driven non-shift transmission between said electric motor and said driving wheel.

19. The power transfer system as claimed in claim 13, wherein said primary clutch means disengages said driving wheel from said electric motor when said rotational speed of said electric motor falls below said predetermined primary rotational speed during a transmitting of a driving torque from said driving wheel to said electric motor;
said secondary clutch means engaging said driving wheel to said electric motor when said rotational speed of said electric motor is between said predetermined secondary rotational speed during a transmitting of a driving torque from said driving wheel to said electric motor, thereby enabling regenerative braking.

* * * * *